(12) United States Patent
Gruchala et al.

(10) Patent No.: US 7,444,171 B2
(45) Date of Patent: Oct. 28, 2008

(54) METHOD AND SYSTEM FOR SHARING SPEED DIAL LISTS AMONGST MULTIPLE TELECOMMUNICATIONS SERVICES

(75) Inventors: Carol Shifrin Gruchala, Naperville, IL (US); Wayne Robert Heinmiller, Elgin, IL (US); Dianna Inara Tiliks, Palatine, IL (US); John Wesley Moss, Lake Zurich, IL (US)

(73) Assignee: SBC Knowledge Ventures, L.P., Reno, NV (US)

( * ) Notice: Subject to any disclaimer, the term of this patent is extended or adjusted under 35 U.S.C. 154(b) by 518 days.

(21) Appl. No.: 11/261,139

(22) Filed: Oct. 28, 2005

(65) Prior Publication Data

US 2007/0099671 A1    May 3, 2007

(51) Int. Cl.
*H04B 1/38* (2006.01)
(52) U.S. Cl. .................. 455/564; 455/419; 455/426.1
(58) Field of Classification Search .............. 455/421, 455/411, 564, 419, 426.1
See application file for complete search history.

(56) References Cited

U.S. PATENT DOCUMENTS

| | | | |
|---|---|---|---|
| 5,355,404 A | 10/1994 | LeDuc et al. | |
| 5,509,058 A | 4/1996 | Sestak et al. | |
| 5,513,256 A | 4/1996 | Komuro | |
| 5,703,942 A | 12/1997 | Pinard et al. | |
| 5,812,946 A | 9/1998 | Nakabayashi et al. | |
| 5,875,405 A | 2/1999 | Honda | |
| 6,029,065 A | 2/2000 | Shah | |
| 6,061,571 A | 5/2000 | Tamura | |
| 6,584,185 B1 | 6/2003 | Nixon | |
| 6,608,889 B2 | 8/2003 | Berthoud et al. | |
| 6,678,367 B1 | 1/2004 | Pickard et al. | |
| 6,745,244 B1 | 6/2004 | Cosgriff et al. | |
| 2002/0044642 A1 | 4/2002 | Danner et al. | |
| 2004/0120496 A1* | 6/2004 | Pickard et al. | 379/216.01 |
| 2006/0132832 A1* | 6/2006 | Lippe et al. | 358/1.15 |

* cited by examiner

*Primary Examiner*—Vincent P Harper
*Assistant Examiner*—Fred A Casca
(74) *Attorney, Agent, or Firm*—Brooks Kushman P.C.

(57) ABSTRACT

A master database stores a speed dial list associated with a user of multiple telecommunications services. The database shares the speed dial list with the telecommunication services such that a single speed dial list serves all of the user's telecommunications services. The database receives speed dial list changes made through one of the telecommunications services and shares the speed dial list changes with the other telecommunications services that the speed dial list is maintained in synchronicity amongst the telecommunications services. As a result, the user does not have to manually keep separate speed dial lists synchronized nor does the user have to memorize or access separate speed dial lists. The speed dial list is locally accessible to the user by being stored on a user phone. The speed dial list is also remotely accessible to the user as the database receives user queries from the user via a user phone.

14 Claims, 3 Drawing Sheets

METHOD AND SYSTEM FOR SHARING SPEED DIAL LISTS AMONGST MULTIPLE TELECOMMUNICATIONS SERVICES

BACKGROUND OF THE DISCLOSURE

1. Field of the Disclosure

The present disclosure generally relates to telephone speed dial lists.

2. Background Art

Phone users have separate speed dial capabilities for each phone line (such as wireline, wireless, and Voice over Internet Protocol (VoIP) phone lines). Requiring users themselves to synchronize different speed dial lists amongst multiple telecommunications services requires the users to exert a relatively large amount of effort. Alternatively, users have to remember different speed dial lists for each telecommunications service.

Independent speed dial lists create further problems for users having a telecommunications service that combines wireline and wireless services such as FastForward™. For users with such combined services, it may not be clear as to which "service mode" they are in (i.e., whether they are in a wireline service mode or a wireless service mode), and which speed dial list (wireline or wireless) is currently active.

BRIEF DESCRIPTION OF THE DRAWINGS

The present disclosure is pointed out with particularity in the appended claims. However, other features of the present disclosure will become more apparent and the present disclosure will be best understood by referring to the following detailed description in conjunction with the accompanying drawings in which:

DETAILED DESCRIPTION OF THE PREFERRED EMBODIMENT(S)

Figure 1:
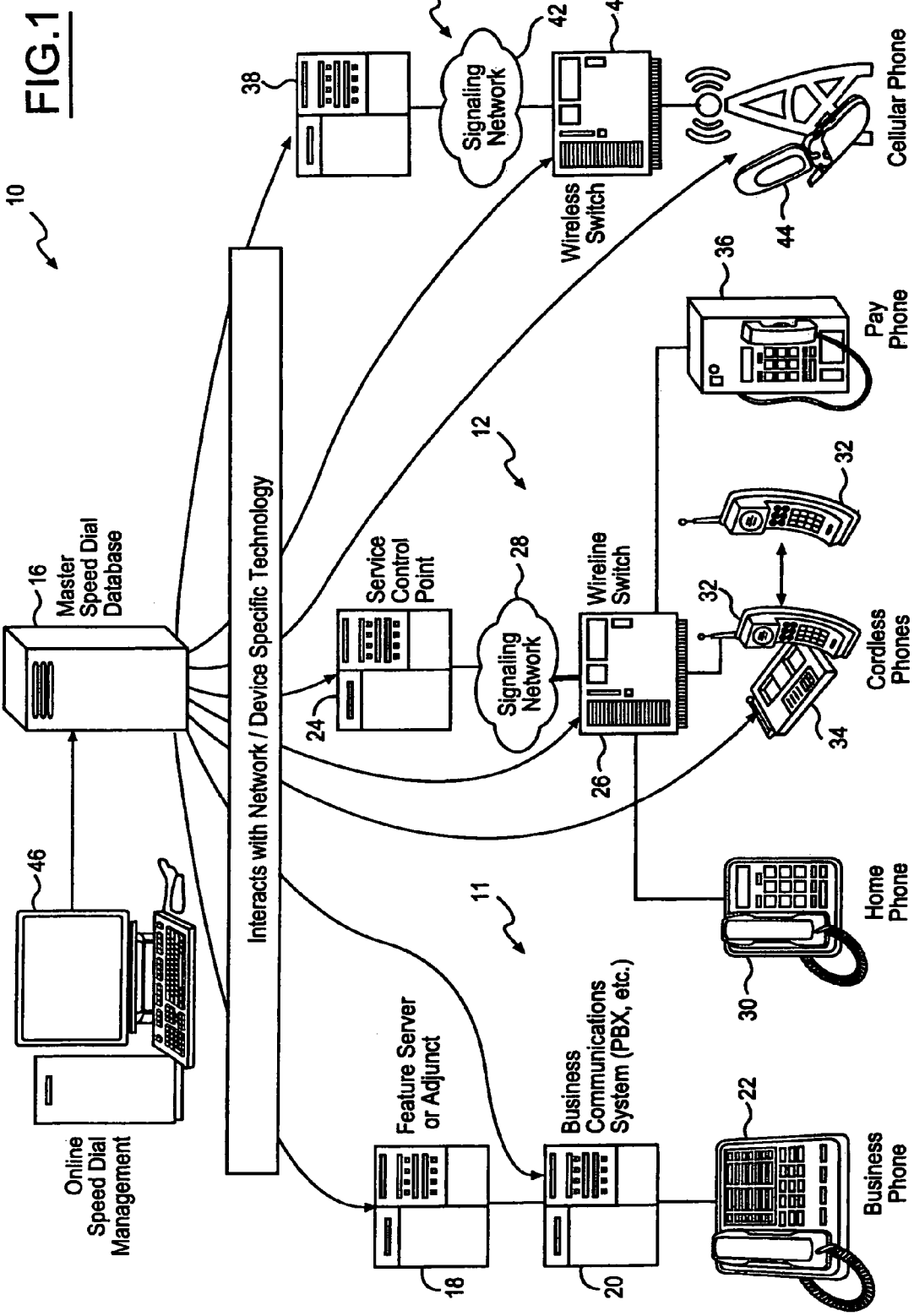
FIG. 1 illustrates a telecommunications network in accordance with an embodiment of the present disclosure.

The present disclosure discloses a telecommunications system having a master source in communication with a first network (e.g., a wireline network) which enables a user to place a call from a first user phone to another phone via the first network, a second network (e.g., a wireless network) which enables the user to place a call from a second user phone to another phone via the second network, and the user phones. The master source stores a user profile associated with the user. The user profile includes information indicative of speed dialing capabilities of the networks and the user phones. The user profile further includes a speed dial list associated with the user. The speed dial list has speed dialing sequences which respectively correspond to phone numbers of other phones. The master source uses the user profile to selectively provide a copy of the speed dial list to the networks and the user phones based on their speed dialing capabilities. In response to the user using the first user phone to place a call to another phone by dialing on the first user phone the speed dialing sequence corresponding to the other phone, at least one of the first network and the first user phone uses the copy of the speed dial list in order to convert the dialed speed dialing sequence to the phone number corresponding to the other phone for the user to place the call from the first user phone to the other phone via the first network. In response to the user using the second user phone to place a call to another phone by dialing on the second user phone the speed dialing sequence corresponding to the other phone, at least one of the second network and the second user phone uses the copy of the speed dial list in order to convert the dialed speed dialing sequence to the phone number corresponding to the other phone for the user to place the call from the second user phone to the other phone via the second network.

The present disclosure further discloses a telecommunications method for use with first and second networks in which the first network enables a user to place a call from a first user phone to another phone via the first network and the second network enables the user to place a call from a second user phone to another phone via the second network. The method includes storing a user profile associated with the user in a master source which is in communication with the networks and the user phones. The user profile includes information indicative of speed dialing capabilities of the networks and the user phones. The user profile further includes a speed dial list associated with the user. The speed dial list has speed dialing sequences which respectively correspond to phone numbers of other phones. The user profile is used to selectively download a copy of the speed dial list from the master source to the networks and the user phones based on their speed dialing capabilities. In response to the user using the first user phone to place a call to another phone by dialing on the first user phone the speed dialing sequence corresponding to the other phone, at least one of the first network and the first user phone uses the copy of the speed dial list in order to convert the dialed speed dialing sequence to the phone number corresponding to the other phone for the user to place the call from the first user phone to the other phone via the first network. In response to the user using the second user phone to place a call to another phone by dialing on the second user phone the speed dialing sequence corresponding to the other phone, at least one of the second network and the second user phone uses the copy of the speed dial list in order to convert the dialed speed dialing sequence to the phone number corresponding to the other phone for the user to place the call from the second user phone to the other phone via the second network.

In accordance with the present disclosure, a single speed dial list that serves all of a user's telecommunications services (such as wireline, wireless, and VoIP services) is associated with the user. An advantage provided by the present disclosure is that users no longer have to manually keep speed dial lists synchronized amongst their multiple telecommunications services.

A master source such as a master speed dial database stores the single speed dial list associated with each user (i.e., the user's speed dial list). The master source is operable to enable a user to access and manage the speed dial list associated with the user via the Internet. The master source is further operable to enable a user to access and manage the speed dial list associated with the user via an interactive dial-up session (e.g., interactive voice response) established by the user using any of the user's phones. The single speed dial list associated with a user is locally accessible to the user by being stored on a handset of the user. The single speed dial list associated with a user is also remotely accessible from the master source by the user.

As such, the master source maintains master speed dial lists respectively associated with users. Depending on a user's telecommunications services, (e.g., wireline, wireless, etc.), the master source has multiple ways to distribute the speed dial list associated with a user to the user's telecommunications services. For example, the master source downloads the speed dial list associated with the user to a switch serving the user for wireline and VoIP services. The master source downloads the speed dial list associated with the user to a home location register (HLR) or other wireless supporting technology serving the user for wireless service. The master source downloads the speed dial list associated with the user to a service control point (SCP) serving the user for either wireline or wireless services. The master source downloads the speed dial list associated with the user to the user's handset such as a cordless phone, a cellular phone, etc.

As a result, the speed dial list associated with the user is stored in the master source as a master copy and other copies of the speed dial list associated with the user are stored in other locations as described. The present disclosure employs database management techniques in order to keep all of the copies of the speed dial list associated with the user in synch such that a single speed dial list is essentially associated with the user. The present disclosure employs database management techniques in order to propagate changes made to one copy of the speed dial list associated with the user to all other speed dial list copies such that the speed dial list copies are synchronized with one another.

The master source stores a user profile along with the speed dial list associated with a user. A user profile generally includes information regarding which phones belong to a user and which capabilities are associated with the phones belonging to the user. The master source generally shares the user's speed dial list with the elements of the user's telecommunications services in accordance with the user's profile.

The present disclosure also employs database management techniques in order to generate "sub-speed dial lists" when multiple users (e.g., a family) share one or more telecommunications services. In this case, each family member is associated with their own sub-speed dial list which they manage such that different family members have different speed dial capabilities.

As generally indicated, the present disclosure has numerous features. The features are summarized in greater detail as follows. The present disclosure enables a speed dial list associated with a user to be downloaded into a handset of the user while at the same time enabling the speed dial list to be used by the elements of the multiple telecommunications services for "switch-based" and "network-based" speed dial services. Enabling the speed dial list to be used for switch-based and network-based speed dial services is useful for handsets that do not have the ability or memory to store the speed dial list. Further, the present disclosure enables changes made in a speed dial list stored in a handset of a user to be propagated to other devices of the user (such as other handsets including cordless phones, cellular phones, etc.) which are to share the speed dial list.

The present disclosure enables the wireline and wireless phones of a user to share the speed dial list associated with the user even if the phones are served by separate wireline and wireless switches. The present disclosure enables a speed dial list to be provided to multiple users served by different switches without requiring the speed dial list to be downloaded to the switches. The present disclosure further enables a user to update a speed dial list with changes and then causes the changes to be effective for other users.

Referring now to FIG. 1, a telecommunications network 10 in accordance with an embodiment of the present disclosure is shown. Telecommunications network 10 includes a private branch exchange (PBX) network 11, a wireline network 12, and a wireless network 14 which together provide multiple telecommunications services (PBX, wireline, and wireless services) to users of telecommunications network 10. Each telecommunication service supports speed dialing capabilities.

In accordance with the present disclosure, telecommunications network 10 includes a master speed dial database 16 ("master source"). Master source 16 stores a user profile for each user of telecommunications network. A user profile for a user includes a definition of network and phone capabilities used by the user of telecommunications network 10. Master source 16 stores speed dial lists associated with users along with the user profiles. More particularly, master source 16 stores a first single speed dial list associated with a first user along with the first user profile, a second single speed dial list associated with a second user along with the second user profile, etc.

Master source 16 shares the speed dial lists associated with the users with PBX network 11, wireline network 12, and wireless network 14 in accordance with the user profiles. For instance, master source 16 shares the speed dial list associated with a first user with the elements of PBX network 11, wireline network 12, and wireless network 14 in accordance with the first user profile. Likewise, master source 16 shares the speed dial list associated with a second user with the elements of PBX network 11, wireline network 12, and wireless network 14 in accordance with a second user profile. As a result, the speed dial list associated with a user is shared amongst the multiple telecommunications services provided by telecommunications network 10 to the user and the speed dial list is synchronized amongst the multiple telecommunications services. These telecommunications services use the speed dial list associated with a user when providing speed dialing capabilities to the user.

PBX network 11 includes a feature server or adjunct 18 in communication with a business communications system such as a PBX 20. A business phone 22 is in communication with feature server or adjunct 18 via PBX 20. A user uses business phone 22 to make a call to another phone via PBX network 11.

Master source 16 communicates with feature server or adjunct 18 to download to the feature server or adjunct the speed dial list associated with the user. Feature server or adjunct 18 communicates with master source 16 via PBX network 11 to propagate to the master source any changes made to the speed dial list associated with the user. The user uses business phone 22 to make changes to the speed dial list associated with the user. In turn, feature server or adjunct 18 propagates these changes to master source 16. Feature server or adjunct 18 uses the speed dial list associated with the user to provide network-based speed dialing services to the user when the user is using business phone 22 to make a call to another phone via PBX network 11. Feature server or adjunct 18 provides the speed dial list associated with the user to business phone 22 for the business phone to display for the user's use.

Similarly, master source 16 communicates with PBX 20 to download to the PBX the speed dial list associated with the user. PBX 20 communicates with master source 16 via PBX network 11 to propagate to the master source any changes made to the speed dial list associated with the user. PBX 20 uses the speed dial list to provide switch-based speed dialing services to the user when the user is using business phone 22 to make a call to another phone via PBX network 11. PBX 20 provides the speed dial list associated with the user to business phone 22 for the business phone to display for the user's use.

Wireline network 12 includes a service control point (SCP) 24 in communication with a wireline switch 26 via a wireline signaling network 28. A plurality of wireline phones are in communication with the wireline switch. The wireline phones include a home telephone 30, cordless phones 32 having a cordless phone base station 34, and a pay phone 36. The user uses any of the wireline phones to make a wireline call to another phone via wireline network 12.

Master source 16 communicates with SCP 24 and/or wireline switch 26 to download to the SCP and/or the wireline switch the speed dial list associated with the user. SCP 24 and/or wireline switch 26 communicate with master source 16 via wireline network 12 to propagate to the master source any changes made to the speed dial list associated with the user. The user uses a wireline phone to make changes to the speed dial list associated with the user. In turn, SCP 24 and/or wireline switch 26 propagates these changes to master source 16. SCP 24 uses the speed dial list associated with the user to provide network-based speed dialing services to the user when the user is using a wireline phone to make a call to another phone via wireline network 12. Wireline switch 26 uses the speed dial list associated with the user to provide switch-based speed dialing services to the user when the user is using a wireline phone to make a call to another phone via wireline network 12. SCP 24 and/or wireline switch 26 provide the speed dial list associated with the user to the wireline phones for the wireline phones to display for the user's use.

Some of the wireline phones such as cordless phones 32 have memory for storing the speed dial list associated with the user. In this case, master source 16 communicates with cordless phone base station 34 to download to the base station the speed dial list associated with the user. In turn, cordless phone base station 34 communicates the speed dial list associated with the user to cordless phones 32 for storage on the cordless phones. Additionally or alternatively, cordless phone base station 34 stores the speed dial list associated with the user for use by the user. Cordless phone base station 34 communicates with master source 16 via wireline network 12 to propagate to the master source any changes made to the speed dial list associated with the user. The user uses a cordless phone 32 to make changes to the speed dial list associated with the user. In turn, cordless phone base station 34 propagates these changes to master source 16. Cordless phones 32 and cordless phone base station 34 use the stored speed dial list associated with the user to provide "phone-based" speed dialing services to the user when the user is using a cordless phone to make a call to another phone via wireline network 12. Cordless phones 32 display the speed dial list associated with the user for the user's use.

Wireless network 14 includes a wireless home location register (HLR) 38 in communication with a wireless switch 40 via a wireless signaling network 42. A cellular phone 44 is in communication with wireless switch 40. The user uses cellular phone 44 to make a wireless call to another phone via wireless network 14.

Master source 16 communicates with HLR 38 and/or wireless switch 40 to download to the HLR and/or the wireless switch the speed dial list associated with the user. HLR 38 and/or wireless switch 40 communicate with master source 16 via wireless network 14 to propagate to the master source any changes made to the speed dial list associated with the user. The user uses cellular phone 44 to make changes to the speed dial list associated with the user. In turn, HLR 38 and/or wireless switch 40 propagates these changes to master source 16. HLR 38 uses the speed dial list associated with the user to provide network-based speed dialing services to the user when the user is using cellular phone 44 to make a call to another phone via wireless network 14. Wireless switch 40 uses the speed dial list associated with the user to provide switch-based speed dialing services to the user when the user is using cellular phone 44 to make a call to another phone via wireless network 14. HLR 38 and/or wireless switch 40 provide the speed dial list associated with the user to cellular phone 44 for the cellular phone to display for the user's use.

Cellular phone 44 has memory for storing the speed dial list associated with the user. As such, master source 16 communicates with cellular phone 44 to download to the cellular phone the speed dial list associated with the user. Cellular phone 44 communicates with master source 16 via wireless network 14 to propagate to the master source any changes made to the speed dial list associated with the user. The user uses cellular phone 44 to make changes to the speed dial list associated with the user. In turn, cellular phone 44 propagates these changes to master source 16. Cellular phone 44 uses the stored speed dial list associated with the user to provide phone-based speed dialing services to the user when the user is using the cellular phone to make a call to another phone via wireless network 14. Cellular phone 44 displays the speed dial list associated with the user for the user's use.

As described, master source 16 stores the speed dial list associated with the user. The user uses business phone 22 to make a call to another phone via PBX network 11. The user uses any of the wireline phones 30, 32, and 36 to make a call to another phone via wireline network 12. The user uses cellular phone 44 to make a call to another phone via wireless network 14.

As described, master source 16 distributes the speed dial list associated with the user to the network platforms (such as feature server or adjunct 18, SCP 24, and HLR 38), the switch platforms (such as PBX 20, wireline switch 26, and wireless switch 40), and the handsets (such as cordless phone 32 and cellular phone 44) in accordance with the user's profile such that the speed dial list associated with the user is synchronized amongst the network-platforms, the switch-platforms, and the handsets. Master source 16 further updates the speed dial list with any changes and distributes the speed dial list changes to the platforms and the handsets such that the speed dial list maintains its synchronism. As a result, the user's speed dial list stored in master source 16 and the network platforms, the switch platforms, and the handsets servicing the user is the same. That is, a single speed dial list associated with the user is accessible for use by PBX network 11, wireline network 12, and wireless network 14 for providing speed dial capabilities to the user when the user is making a call to another phone via any of these networks.

Master source 16 is operable to distribute the user's speed dial list to a subset of the platforms and handsets in accordance with the user's profile. For instance, master source 16 selectively downloads the user's speed dial list to a phone if the phone has memory for storing the speed dial list as indicated by the user's profile. Master source 16 selectively downloads the user's speed dial list to a switch platform if switch-based speed dial capability is available as indicated by the user's profile. Master source 16 selectively downloads the user's speed dial list to a network platform if network-based speed dial capability is available as indicated by the user's profile.

Master source 16 is preferably based as an Internet web server. Alternatively, master source 16 is integrated with any of the service specific platforms provided in telecommunications network 10. Master source 16 interacts with the network platforms, the switch platforms, and the phone devices of telecommunications network 10 using appropriate network/device specific technology.

Figure 2:
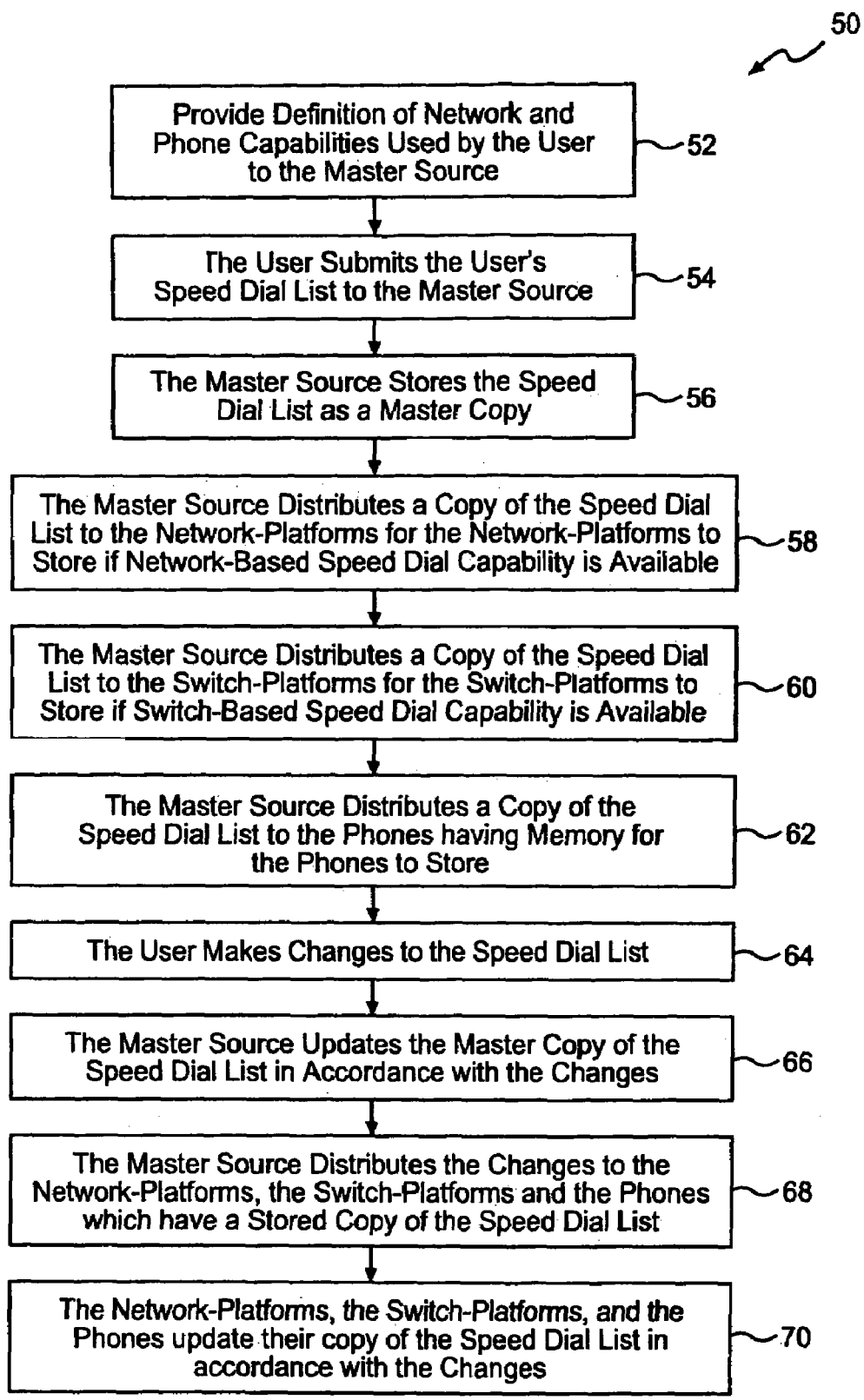
FIG. 2 illustrates a flowchart describing operation of the telecommunications network in accordance with the present disclosure.

Referring now to FIG. 2, with continual reference to FIG. 1, a flowchart 50 describing operation of telecommunications network 10 in accordance with the present disclosure is shown. Flowchart 50 generally describes the process carried out by telecommunications network 10 for sharing a single speed dial list associated with the user amongst multiple telecommunications services. More particularly, flowchart 50 describes the process carried out by telecommunications network 10 for maintaining in synchronicity a single speed dial list associated with the user for PBX network 11, wireline network 12, and wireless network 14 to use to provide speed dial capabilities to the user. Sharing a single speed dial list amongst the multiple telecommunications services includes distributing the speed dial list to the various elements of PBX network 11, wireline network 12, and wireless network 14. Maintaining in synchronicity the single speed dial list includes distributing changes made to the speed dial list to the various elements of PBX network 11, wireline network 12, and wireless network 14.

The operation set forth in flowchart 50 initially includes providing a definition of the network and phone capabilities useable by the user to master source 16 as shown in block 52. This information generally includes a user profile which identifies the identities, configurations, capabilities, etc., of the phones that are associated with the user. For instance, this user profile includes the identities (i.e., phone numbers) of the wireline phones that are in the user's residence and the wireless phones that are associated with the user. The user profile includes information as to how the user's phones are configured and what capabilities they have (e.g., in communication with a PBX, cordless phones having or lacking memory for storing the user's speed dial list, cellular phones in communication with a wireless network, wireline phones lacking memory for storing the user's speed dial list, etc.). In general, the user profile contains information indicative of the user's phones. The user is to be enabled to place a call on any of the user's phones using speed dialing in accordance with the user's speed dial list.

As described above, master source 16 generally shares the user's speed dial list with the elements of the telecommunications services servicing the user in accordance with the user's profile. Master source 16 is configurable to obtain and store the user's profile. Configuration of master source 16 can be accomplished in any number of ways. For instance, an automatic method having the user cause a user's phone to initiate communications to a destination that automatically detects the capabilities associated with the phone and the network (e.g., something like "plug and play"). As another example, a manual method could be accomplished by a user's phone (e.g., the user calls to an IVR and steps through a set-up menu) or web access (e.g., user logs on and chooses configuration details for each phone to be added).

The user then submits the user's speed dial list to master source 16 as shown in block 54. To this end, an online speed dial management system 46 is in communication with master source 16. The user uses online system 46 to communicate with master source 16 using a web browser in order to submit the user's speed dial list to the master source. Alternatively or additionally, the user uses a phone of telecommunications network 10 to interact with a network platform or a switching platform in order to submit the user's speed dial list to master source 16. The phone used by the user to submit the user's speed dial list may be configured to display the user's speed dial list as the user uses the phone to create the user's speed dial list for submission to master source 16. Alternatively or additionally, the user submits the user's speed dial list to a handset having memory (such as cordless phone 32 or cellular phone 44). In this case, the handset uploads the user's speed dial list to master source 16. Again, the handset may be configured to display the user's speed dial list as the user uses the handset to create the user's speed dial list for submission to master source 16.

Master source 16 stores the speed dial list submitted by the user along with the user's profile. Master source 16 stores the speed dial list as a master copy as shown in block 56. Master source 16 distributes a copy of the speed dial list to the network platforms (i.e., feature server or adjunct 18, SCP 24, and HLR 38) if the user's profile indicates that network-based speed dial capability is available for the user as shown in block 58. The network platforms store the copy of the speed dial list as shown in block 58. Master source 16 distributes a copy of the speed dial list to the switch platforms (i.e., PBX 20, wireline switch 26, and wireless switch 40) if the user's profile indicates that switch-based speed dial capability is available for the user as shown in block 60. The switch platforms store the copy of the speed dial list as shown in block 60. Master source 16 distributes a copy of the speed dial list to the user's handsets having memory (i.e., cordless phone 32 and cellular phone 44) as indicated by the user's profile as shown in block 62. These handsets store the copy of the speed dial list as shown in block 62. Consequently, the speed dial list stored by master source 16, the network-platforms, the switch-platforms, and the phones having memory is the same and is in synchronicity. As a result, a single speed dial list associated with the user is accessible for use by PBX network 11, wireline network 12, and wireless network 14 for providing speed dial capabilities to the user when the user is making a call from one of the user's phones to another phone via any of these networks.

The user then makes changes to the user's speed dial list as shown in block 64. To this end, the user uses online system 46 to communicate with master source 16 using a web browser in order to submit speed dial list changes to the master source. Alternatively or additionally, the user uses a phone of telecommunications network 10 to interact with a network platform or a switching platform in order to submit the speed dial list changes to master source 16. Alternatively or additionally, the user submits the user's speed dial list changes to a handset having memory. In this case, the handset uploads the user's speed dial list changes to master source 16.

Master source 16 updates the master copy of the user's speed dial list with the changes as shown in block 66. Master source 16 then distributes the changes to the network-platforms, the switch-platforms, and the user's phones which have a stored copy of the user's speed dial list as shown in block 68. The network-platforms, the switch-platforms, and the user's phones which have a stored copy of the user's speed dial list then update their copy of the user's speed dial list in accordance with the changes as shown in block 70. Consequently, the speed dial list stored by master source 16, the network-platforms, the switch-platforms, and the phones having memory is still the same and is still in synchronicity. As a result, an updated single speed dial list associated with the user is accessible for use by PBX network 11, wireline network 12, and wireless network 14 for providing speed dial capabilities to the user when the user is making a call from one of the user's phones to another phone via any of these networks.

Figure 3:
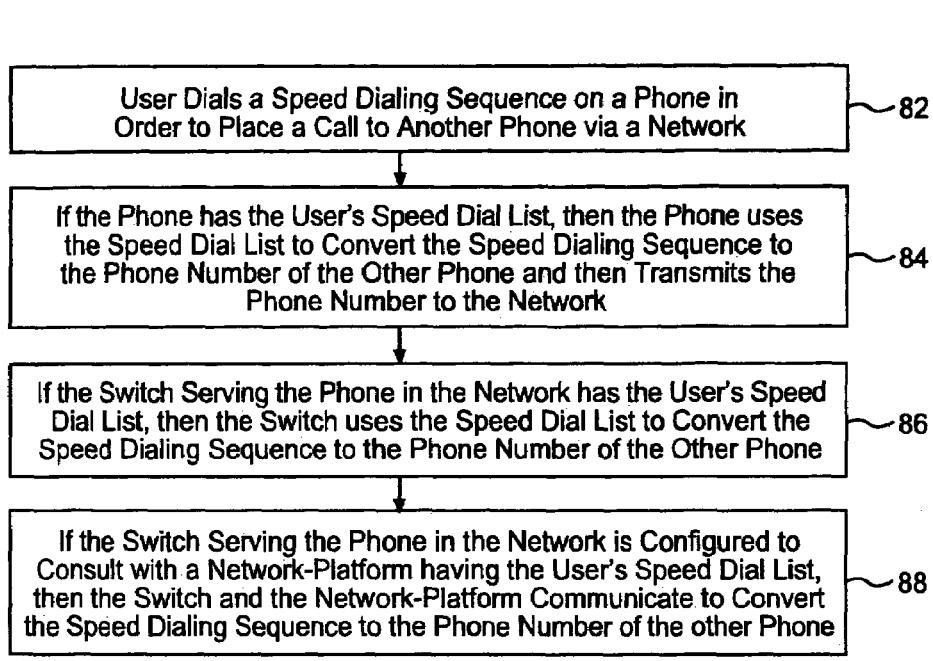
FIG. 3 illustrates a flowchart describing user speed dialing provided by the telecommunications network in accordance with the present disclosure.

Referring now to FIG. 3, with continual reference to FIGS. 1 and 2, a flowchart 80 describing user speed dialing provided by telecommunications network 10 in accordance with the present disclosure is shown. The user uses speed dialing in order to place a call from one of the user's phones to another phone by dialing a speed dialing sequence on the user's phone instead of dialing the phone number of the other phone. To this end, the user's speed dial list includes a plurality of speed dialing sequences such as "#1", "#2", "#3", "#4", etc. Each speed dialing sequence respectively corresponds to a phone number of another phone. For example, the speed dialing sequence "#1" corresponds to the first phone number "123 456-7899". The first phone number, as an example, is the phone number of the user's friend. Similarly, the speed dialing sequence "#2" corresponds to a second phone number "987 654-3211" which, as an example, is the phone number of the office of the user's parent.

In operation, the user dials a speed dialing sequence such as "#1" on one of the user's phone in order to place a call to the user's friend via a network as shown in block 82. For example, the user dials the speed dialing sequence "#1" on home phone 30 in order to place the call to the user's friend via wireline network 12. Similarly, for example, the user dials the speed dialing sequence "#1" on cellular phone 44 in order place the call to the user's friend via wireless network 14.

If the user's phone has a copy of the user's speed dial list stored in memory, such as may be the case when the phone is either cordless phone 32 or cellular phone 44, then the user's phone accesses the stored speed dial list in order to convert the speed dialing sequence ("#1") to the corresponding phone number ("123 456-7899") as shown in block 84. The user's phone then transmits the corresponding phone number to wireless network 14 as shown in block 84 in order to place the call from the user's phone to the user's friend via the wireless network.

Alternatively, if the switch serving the user's phone has a copy of the user's speed dial list, then the switch accesses the speed dial list in order to convert the speed dialing sequence ("#1") to the corresponding phone number ("123 456-7899") as shown in block 86. The network of which the switch belongs to then uses the phone number in order to place the call from the user's phone to the user's friend. For example, the user's phone is home phone 30, the switch is wireline switch 26, and the call is to be placed to the user's friend via wireline network 12. In this case, wireline switch 26 uses the speed dial list to convert the speed dialing sequence to the corresponding phone number and wireline network 12 then uses the corresponding phone number to place the call from home phone 30 to the user's friend. As another example, the user's phone is cellular phone 44, the switch is wireless switch 40, and the call is to be placed to the user's friend via wireless network 14. In this case, wireless switch 40 uses the speed dial list to convert the speed dialing sequence to the corresponding phone number and wireless network 14 then uses the corresponding phone number to place the call from cellular phone 44 to the user's friend.

Alternatively, if the switch serving the user's phone is configured to consult with a network-platform having a copy of the user's speed dial list, then the switch and the network-platform communicate with one another in order to convert the speed dialing sequence ("#1") to the corresponding phone number ('123 456-7899") as shown in block 88. The network of which the switch and the network-platform belong to then uses the phone number in order to place the call from the user's phone to the user's friend. For example, the user's phone is cordless phone 32, the switch is wireline switch 26, the network-platform is SCP 24, and the call is to be placed to the user's friend via wireline network 12. In this case, wireline switch 26 and SCP 24 communicate with one another to use the speed dial list stored in the SCP in order to convert the speed dialing sequence to the corresponding phone number. Wireline network 12 then uses the corresponding phone number to place the call from cordless phone 32 to the user's friend. As another example, the user's phone is cellular phone 44, the switch is wireless switch 40, the network-platform is HLR 38, and the call is to be placed to the user's friend via wireless network 14. In this case, wireless switch 40 and HLR 38 communicate with one another to use the speed dial list stored in the HLR in order to convert the speed dialing sequence to the corresponding phone number. Wireless network 14 then uses the corresponding phone number to place the call from cellular phone 44 to the user's friend.

With reference to FIG. 1, some examples which further describe the present disclosure will now be provided. In a first example, a user is a family having two parents and three children. The family has at its residence a cordless phone system having two cordless phones 32 (with memory) and two plain old home telephones 30 (no memory). A member of the family also has a cellular phone 44. A speed dial list containing speed dialing sequences (#1, #2, #3, #4, etc.) is associated with the family. Master source 16 stores the speed dial list as part of the user profile for the family. The first four speed dialing sequences respectively correspond to the phone numbers of a high school, a grade school, a church, a grandmother. In accordance with the present disclosure, the family members use any of their phones to place a call using a speed dialing sequence contained in the speed dial list. That is, the speed dialing list is shared by the phones and/or the networks serving the phones. As a result, when speed dialing to place a call using a phone the family members do not have to be concerned with which phone is being used to place the call.

In a multi-location retail example, a retailer desires employees to be able to dial the store number and department numbers from any of the retailer's phones located in the retailer's infrastructure using speed dialing. The retailer's infrastructure has a mix of PBX and wireline network services at different locations in the infrastructure. Management of the retailer also has cellular phones. The retailer has a communications manager which keeps master source 16 up to date with the retailer's speed dial list. Master source 16 stores the retailer's speed dial list as part of the user profile for the retailer. The speed dial list includes speed dialing sequences which correspond to the store number and the department numbers. In accordance with the present disclosure, master source 16 updates the speed dial list for all of the retailer's phones (i.e., the phones in the retailer's infrastructure and the cellular phones associated with the retailer's management). Master source 16 updates the speed dial list for all of the retailer's phones in a manner that is appropriate for the technology capabilities available to each phone as indicated by the retailer's profile. For instance, master source 16 distributes speed dial list updates to feature server or adjunct 18 and/or PBX 20 for the retailer's phones which are part of a PBX network. Similarly, master source 16 distributes speed dial list updates to SCP 24 and/or wireline switch 26 for the retailer's wireline phones which are part of the wireline network. Similarly, master source 16 distributes speed dial list updates to HLR 38 and/or wireless switch 44 for the retailer's cellular phones which are part of the wireless network. In this case, master source 16 additionally or alternatively distributes speed dial list updates to the retailer's cellular phones (which have speed dial list memory capability).

With reference to FIG. 1, additional capabilities provided by the present disclosure will now be described. One additional capability provided by the present disclosure includes the ability to enable the user to have speed dial capability when using pay phone 36. Pay phone 36 is part of wireline network 12. As described above, SCP 24 and/or wireline switch 26 have a copy of the user's speed dial list. As such, the user uses pay phone 36 to dial an access number. In response to receiving the dialed access number, wireline switch 26 accesses the user's speed dial list stored in either the wireline switch and/or SCP 24 to provide the user with speed dialing capability. The user then dials a speed dialing sequence using pay phone 36 and wireline switch 26 uses the user's speed dial list to convert the speed dialing sequence to the corresponding phone number. Consequently, the user is able to perform speed dialing from any phone that is not part of the user's profile in master source 16.

Another additional capability provided by the present disclosure includes the ability to convert a user's speed dial list into sub-speed dial lists when multiple users (such as a family) share phones in telecommunications network 10. In this case, one of the users identifies him or herself using a dialed code, speech recognition, etc. when using one of the user phones to place a call. This identification is used to select the sub-speed dial list that corresponds to this user such that the selected sub-speed dial list is accessed in order to allow the user to place the call using speed dialing. This provides specific exceptions to the master speed dial list associated with the family. As an example, the speed dialing sequence "#9" corresponds to the phone number of a first family member's best friend while the same speed dialing sequence "#9" corresponds to the phone number of a second family member's favorite radio station.

Figure 4:
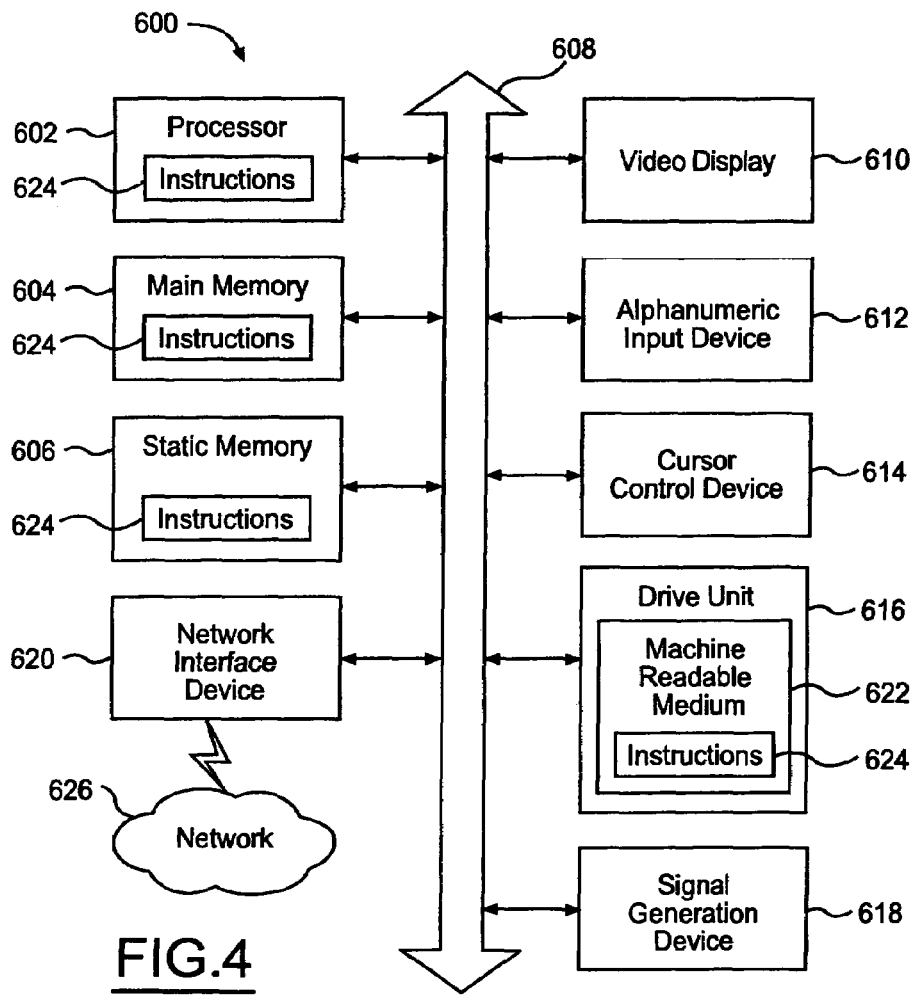
FIG. 4 illustrates a diagrammatical representation of a machine in the form of a computer system within which a set of instructions, when executed, causes the machine to perform any one or more of the methodologies in accordance with the present disclosure.

Referring now to FIG. 4, a diagrammatic representation of a machine in the form of a computer system 600 is shown within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may include a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

Computer system 600 may include a processor 602 (e.g., a central processing unit (CPU), a graphics processing unit (GPU), or both), a main memory 604 and a static memory 606, which communicate with each other via a bus 608. Computer system 600 may further include a video display unit 610 (e.g., a liquid crystal display (LCD), a flat panel, a solid state display, or a cathode ray tube (CRT)). Computer system 600 may include an input device 612 (e.g., a keyboard), a cursor control device 614 (e.g., a mouse), a disk drive unit 616, a signal generation device 618 (e.g., a speaker or remote control) and a network interface device 620.

Disk drive unit 616 may include a machine-readable medium 622 on which is stored one or more sets of instructions (e.g., software 624) embodying any one or more of the methodologies or functions described herein, including those methods illustrated in herein above. Instructions 624 may also reside, completely or at least partially, within main memory 604, static memory 606, and/or within processor 602 during execution thereof by computer system 600. Main memory 604 and processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using instructions 624. Instructions 624 may further be transmitted or received over a network 626 via network interface device 620.

While machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the present disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the present disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. The Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "disclosure" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A telecommunications system comprising:
   a master source in communication with a wireline network which enables a user to place a call from a wireline user phone to another phone via a wireline switch of the wireline network, a wireless network which enables the user to place a call from a wireless user phone to another phone via a wireless switch of the wireless network, and the user phones;

wherein the master source stores a user profile associated with the user, the user profile including information identifying the user phones, the wireline switch, and the wireless switch, the user profile further including a speed dial list associated with the user, the speed dial list having speed dialing sequences which respectively correspond to phone numbers of other phones, wherein the master source uses the user profile to determine which phones are the user phones, which switch is the wireline switch, and which switch is the wireless switch in order for the master source to selectively provide a copy of the speed dial list to the user phones, the wireline switch, and the wireless switch;

wherein in response to the user using the wireline user phone to place a call to another phone by dialing on the wireline user phone the speed dialing sequence corresponding to the other phone, at least one of the wireline switch and the wireline user phone uses the copy of the speed dial list in order to convert the dialed speed dialing sequence to the phone number corresponding to the other phone for the user to place the call from the wireline user phone to the other phone via the wireline network;

wherein in response to the user using the wireless user phone to place a call to another phone by dialing on the wireless user phone the speed dialing sequence corresponding to the other phone, at least one of the wireless switch and the wireless user phone uses the copy of the speed dial list in order to convert the dialed speed dialing sequence to the phone number corresponding to the other phone for the user to place the call from the wireless user phone to the other phone via the wireless network;

wherein at least one of the user phones communicates with the master source to propagate speed dial list changes to the master source, wherein the master source updates the speed dial list stored by the master source in accordance with the changes and then uses the user profile to determine which phones are the user phones, which switch is the wireline switch, and which switch is the wireless switch in order for the master source to provide the speed dial list changes to the user phones, the wireline switch, and the wireless switch for the user phones, the wireline switch, and the wireless switch to update their copy of the speed dial list in accordance with the changes.

2. The system of claim 1 further comprising:
   an online system in communication with the master source, wherein the master source receives the speed dial list from the user via the online system and then stores the speed dial list as part of the user profile.

3. The system of claim 1 wherein:
   the master source receives the speed dial list from the user via at least one of the user phones and then stores the speed dial list as part of the user profile.

4. The system of claim 1 wherein:
   at least one of the user phones displays the copy of the speed dial list for the user to see.

5. The system of claim 1 wherein:
   the wireline user phone is one of a telephone, a cordless phone, and a pay phone.

6. The system of claim 1 wherein:
   the wireless user phone is a cellular phone.

7. The system of claim 1 wherein:
   the wireline network includes a wireline network-platform, wherein the master source provides the copy of the speed dial list to the wireline network-platform;

wherein in response to the user using the wireline user phone to place a call to another phone by dialing on the wireline user phone the speed dialing sequence corresponding to the other phone, the wireline network-platform uses the copy of the speed dial list to convert the dialed speed dialing sequence to the phone number corresponding to the other phone for the user to place the call from the wireline user phone to the other phone via the wireline network.

8. The system of claim 1 wherein:

the wireless network includes a wireless network-platform, wherein the master source provides the copy of the speed dial list to the wireless network-platform;

wherein in response to the user using the wireless user phone to place a call to another phone by dialing on the wireless user phone the speed dialing sequence corresponding to the other phone, the wireless network-platform uses the copy of the speed dial list to convert the dialed speed dialing sequence to the phone number corresponding to the other phone for the user to place the call from the wireless user phone to the other phone via the wireless network.

9. The system of claim 1 wherein:

either network enables the user to place a call from a third phone lacking user profile information associated with the user to another phone via the network;

wherein in response to the user using the third phone to place a call to another phone by dialing on the third phone the speed dialing sequence corresponding to the other phone, the network uses the copy of the speed dial list to convert the dialed speed dialing sequence to the phone number corresponding to the other phone for the user to place the call from the third phone to the other phone via the network.

10. A telecommunications method for use with a wireline network and a wireless network, the wireline network enabling a user to place a call from a wireline user phone to another phone via a wireline switch of the wireline network, the wireless network enabling the user to place a call from a wireless user phone to another phone via a wireless switch of the wireless network, the method comprising:

storing a user profile associated with the user in a master source which is in communication with the networks and the user phones, the user profile including information identifying the user phones, the wireline switch, and the wireless switch, the user profile further including a speed dial list associated with the user, the speed dial list having speed dialing sequences which respectively correspond to phone numbers of other phones;

using the user profile by the master source to determine which phones are the user phones, which switch is the wireline switch, and which switch is the wireless switch in order for the master source to selectively download a copy of the speed dial list from the master source to the user phones, the wireline switch, and the wireless switch;

in response to the user using the wireline user phone to place a call to another phone by dialing on the wireline user phone the speed dialing sequence corresponding to the other phone, using by at least one of the wireline switch and the wireline user phone the copy of the speed dial list in order to convert the dialed speed dialing sequence to the phone number corresponding to the other phone for the user to place the call from the wireline user phone to the other phone via the wireline network;

in response to the user using the wireless user phone to place a call to another phone by dialing on the wireless user phone the speed dialing sequence corresponding to the other phone, using by at least one of the wireless switch and the wireless user phone the copy of the speed dial list in order to convert the dialed speed dialing sequence to the phone number corresponding to the other phone for the user to place the call from the wireless user phone to the other phone via the wireless network;

communicating from at least one of the user phones with the master source to propagate speed dial list changes to the master source;

updating in the master source the speed dial list stored by the master source in accordance with the changes; and using by the master source the user profile to determine which phones are the user phones, which switch is the wireline switch, and which switch is the wireless switch in order for the master source to provide the speed dial list changes to the user phones, the wireline switch, and the wireless switch for the user phones, the wireline switch, and the wireless switch to update their copy of the speed dial list in accordance with the changes.

11. The method of claim 10 further comprising:

providing the speed dial list from a user online system to the master source for the master source to store as part of the user profile.

12. The method of claim 10 further comprising:

providing the speed dial list from at least one of the user phones to the master source for the master source to store as part of the user profile.

13. The method of claim 10 further comprising:

displaying on at least one of the user phones the copy of the speed dial list for the user to see.

14. The method of claim 10 wherein:

the wireline user phone is one of a telephone, a cordless phone, and a pay phone;

wherein the wireless user phone is a cellular phone.

\* \* \* \* \*